Patented May 7, 1929.

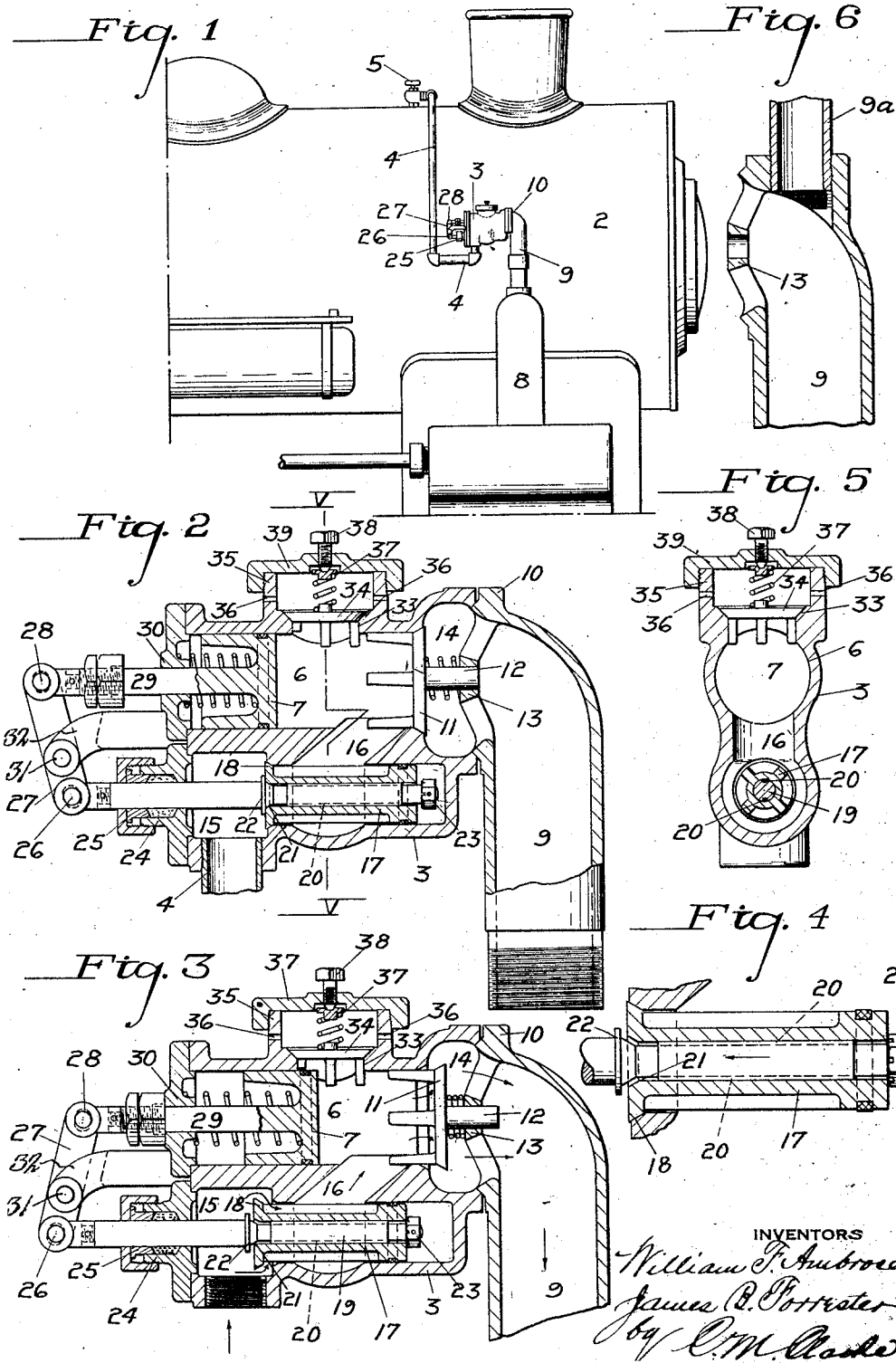

1,712,015

UNITED STATES PATENT OFFICE.

WILLIAM F. AMBROSE AND JAMES B. FORRESTER, OF WOODLAWN, PENNSYLVANIA.

FLOATING VALVE.

Application filed March 18, 1924. Serial No. 700,013.

Our invention is in the class of floating valves for steam locomotives and the like. It has for its object to provide a simple, efficient, and economical means for admitting a limited amount of live steam to the cylinders during drifting, as on down grades, stopping, etc., when the throttle is closed. Under such circumstances, a state of partial vacuum is established, due to the reciprocation of the pistons, together with overheating, poor lubrication and other objectionable conditions. Our invention is adapted to automatically admit a sufficient amount of steam to the cylinders by a valve mechanism controlled by and operating in conformity with the vacuum conditions. The invention contemplates the provision of suitable check valves for releasing pressure in the drifting valve structure after the valve has ceased to function and the provision of a check valve in the system for preventing the escape of steam from the engine through the system when the engine throttle is open.

The present invention is an improvement on the construction of pending application of W. F. Ambrose, filed August 6, 1923, Serial No. 655,947.

In the drawings, showing one preferred embodiment of the invention:

Fig. 1 is a view in side elevation, showing the invention applied to a locomotive;

Fig. 2 is an enlarged vertical sectional view of the steam supply valve in normal position;

Fig. 3 is a partial similar view, showing the valve opened;

Fig. 4 is an enlarged sectional detail view, showing the initial movement of the equalizing valve stem;

Fig. 5 is a cross section on the line V—V of Fig. 2; and

Fig. 6 is a sectional detail view, showing a modified construction.

At each side of the locomotive boiler 2 is located a combined cylinder and valve chamber within a casing 3, to which steam is supplied from the boiler by a pipe 4 preferably controlled by a valve or cock 5. The upper portion of casing 3 embodies a cylinder 6 within which is a piston or plunger 7 in suction communication with the main cylinder through valve chest 8 of the locomotive, and its usual ports, by a connecting conduit 9. In this respect, plunger 7 occupies a position which is, in effect, directly within suction conduit 9, or an extension thereof forming the plunger cylinder 6, so that it is directly and immediately affected by any change in the conditions within conduit 9. A spring 39 assists plunger 7 on its inward movement.

Said conduit forms an extension of cylinder 6 by flange connections 10 and provides a supporting standard for the valve casing, as shown.

However, for the purpose of automatically closing off pressure from the steam chest back through conduit 9 during normal operation of the locomotive, a check valve 11 is mounted by its stem 12 in spider bearing 13 of the conduit, with an intervening enlarged chamber 14 beyond the seat for check valve 11. Although a spring is shown for the valve 11, said spring may be disregarded, inasmuch as it is only a light spring and may be omitted, said spring not being intended to close the valve.

Steam pipe 4 leads to a chamber 15 in the casing 3 having a valve controlled port or passage 16 leading to the conduit 9 inwardly beyond the plunger 7, when check valve 11 is opened by suction. Circulation between chamber 15 and the conduit 9, through port 16, is controlled by a piston valve 17 having a front globe valve terminal 18 normally seated by steam pressure, and a reduced middle portion for circulation clearance.

A stem 19 with circulation slots 20 extends through valve 17, with a valve 21 on the stem preferably having an enlarged flange 22 providing pressure area. When valve 21 is seated, stem 19 extends beyond the piston end of valve 17 and is provided with a terminal nut 23 spaced slightly beyond, providing for a limited forward movement of the stem without moving the inner valve 17. Stem 19 extends through head 24 of casing 3 and a stuffing box 25 thereof, and is pivotally connected at 26 to lever 27. Said lever is similarly connected at 28 to the outer end of loosely fitted stem 29 of plunger 7 beyond the bearing head 30 of casing 6. The loose bearing for stem 29 is merely a guiding fit, allowing for air circulation. Lever 27 is pivotally fulcrumed at 31 to a bracket 32, as shown, the leverage proportions being regulated by the relative location of the fulcrum.

Casing 6 has release communication with the atmosphere through a port 33 covered by a check valve 34 in a casing 35 open to the atmosphere through ports 36. A regulable pressure spring 37 controlled by set screw 38 of cap 39 provides a limited reseating pressure.

Under normal running conditions with the throttle open, check valve 11 is maintained closed by ordinary steam pressure through conduit 9, and valves 18 and 21 are closed by pressure through pipe 4. With the throttle closed, reciprocation of the locomotive pistons, with resulting vacuum in conduit 9, will unseat check valve 11 and exert suction on plunger 7. The initial movement of the plunger towards conduit 9 will move stem 19 outwardly sufficient to unseat valve 21, whereupon steam will pass along ports 20 and underneath nut 23, which is grooved on its under side for circulation, behind the piston head of valve 17, equalizing the pressure.

Upon the nut 23 engaging the end of the valve 17, it will be moved outwardly, unseating valve 18 and allowing steam to pass through port 16, past open check valve 11, and through conduit 9 to the steam chest. Such admission of steam will be proportioned to the continuance of the existing conditions, and will continue during drifting movement of the locomotive, thus furnishing sufficient steam to the steam chests and cylinders for lubrication.

With the parts in the position shown in Fig. 3, during the drifting of the locomotive, the opening of the throttle will result in steam rushing up the conduit 9. The pressure of the steam in the casing or chamber 6 acting against the plunger 7 will close the valves 21 and 18, and the check or relief valve 34 is forced open by the pressure after the valves 21 and 18 have been seated, to permit the pressure in the casing 6 to be relieved so that the valve 11 is seated. The valve 11 being closed will relieve the plunger or piston 7 of steam pressure. The device would be operable with the valves 11 and 34 omittted, but the valve 11 is essential to relieve the plunger 7 and parts connected thereto from pressure and strain during the normal operating conditions of the locomotive. When using the valve 11, the check or relief valve 34 is essential, in order that the valve 11 will be closed by steam pressure through the conduit 9 from the steam chest, and the valve 11 must be free to open, so that there cannot be appreciable spring resistance to the opening of the valve 11.

When the plunger 7 is moved by the steam pressure in the casing 6, the valve 21 is seated before the valve 18 is seated, and although some steam may be trapped behind the piston valve 17 this will not prevent the valve 18 from closing, due to the fact that the piston valve 17 has a loose sliding fit so as to permit of leakage, and the spring 37 of the valve 34 is so adjusted that the steam pressure will assure of the valves 21 and 18 being seated before the valve 34 opens.

Ordinarily, we locate one complete drifting valve at each side of the locomotive, each having an individual connection 9 to the cylinder valve chest 8 at the same side, providing a duplicate equipment like that shown in Fig. 1. However, if desired, but one drifting valve may be utilized, at either side, with the steam supply connection 4 and a supplemental branch pipe 9ª may be connected to the top of conduit 9 leading over to the other valve chest at the opposite side, providing a double connection from both valve chests. Such connection may be made by the modified construction of Fig. 6, the drifting valve otherwise being constructed and operating in the same manner as above described.

The construction and operation of the invention will be clear from the foregoing description. It may be changed or varied in arrangement of the parts by the skilled mechanic, to adapt it to varying conditions of application or use.

What we claim is:

1. An automatic drifting valve for locomotives comprising a chambered casing having a suction conduit, a movable head therein, a valve controlled steam supply conduit leading through the chambered casing to the suction conduit, a steam controlling valve operatively connected with the movable head, a check valve interposed between the movable head and the suction conduit, and a check valve on the casing leading to atmosphere for relieving pressures above normal in the casing.

2. An automatic drifting valve for locomotives comprising a chambered casing having a suction conduit, a movable head therein, a valve controlled steam supply conduit leading through the chambered casing to the suction conduit, and a steam controlling valve having a by-pass therethrough through which equalizing pressure on opposite sides of the valve may be established, a reciprocable valve stem operatively connected with the movable head and having a slight relative motion with respect to the valve, and an equalizing by-pass valve on the valve stem operated through said slight relative movement to control the by-pass through the steam controlling valve.

3. An automatic drifting valve for locomotives comprising a chambered casing having a suction conduit, a movable head therein, a valve controlled steam supply conduit leading through the chambered casing to the suction conduit, a steam controlling valve adapted to open and close steam communication to the suction conduit, and a stem therefor operatively connected with the movable head and having a lost motion connection with the valve having an auxiliary valve element thereon adapted to open and close circulation through an auxiliary passage in the steam controlling valve through said lost motion connection for balancing pressure thereon and then to move the valve.

4. An automatic drifting valve for locomotives comprising a chambered casing having a suction conduit, a movable head therein, a valve controlled steam supply conduit leading through the chambered opening to the suction conduit, a steam controlling valve operatively connected with the movable head, an outwardly opening check valve controlling exhaust from the chambered casing to the atmosphere, and a check valve in the suction conduit closing toward the movable head.

5. In combination, a plunger casing having a suction conduit for connection with a locomotive engine cylinder, a movable head in the casing subject to suction, a valve casing having a steam inlet opening and a port leading to the plunger casing, an intervening steam valve having a relatively movable stem, a pivotally mounted lever connecting said stem with the movable head, an outwardly opening check valve leading to the atmosphere, and an outwardly opening check valve controlling flow through the conduit.

6. In combination, a plunger casing having a suction conduit for connection with a locomotive engine cylinder, a movable head in the casing subject to suction, a valve casing having a steam inlet opening and a port leading to the plunger casing, an intervening steam valve having a stem, a pivotally mounted lever connecting said stem with the movable head, and an outwardly movable check valve permitting circulation from the plunger casing to the suction conduit.

7. In an automatic drifting valve provided with a suction conduit, a plunger casing, and a movable head therein; a steam valve casing communicating with the plunger casing and having a steam supply connection, a hollow steam circulation controlling valve, a stem extending therethrough having a valve at one end and an abutment at the other, and a pivoted lever connecting said valve stem with the plunger.

8. In an automatic drifting valve provided with a suction conduit, a plunger casing, and a movable head therein; a steam valve casing communicating with the plunger casing and having a steam supply connection, a hollow steam circulation controlling valve, a longitudinally channeled stem extending through the steam valve having a valve at one end and an abutment at the other adapted to a limited independent movement and to then move the steam valve, and a pivoted lever connecting said valve stem with the plunger.

In testimony whereof we hereunto affix our signatures.

WILLIAM F. AMBROSE.
JAMES B. FORRESTER.